United States Patent
Morris, Jr. et al.

[11] Patent Number: 5,908,475
[45] Date of Patent: *Jun. 1, 1999

[54] GAS/AIR MIXER

[75] Inventors: Corydon E. Morris, Jr., Columbus; Daniel L. Morin, North Vernon, both of Ind.

[73] Assignee: Cummins Engine Company, Inc., Columbus, Ind.

[*] Notice: This patent issued on a continued prosecution application filed under 37 CFR 1.53(d), and is subject to the twenty year patent term provisions of 35 U.S.C. 154(a)(2).

[21] Appl. No.: 08/581,961

[22] Filed: Jan. 2, 1996

[51] Int. Cl.$^6$ ..................................................... B01F 3/02
[52] U.S. Cl. ........................ 48/189.3; 123/525; 123/590
[58] Field of Search ......................... 48/189.1, 189.3, 48/189.4; 123/525, 527, 590

[56] References Cited

U.S. PATENT DOCUMENTS

| | | | |
|---|---|---|---|
| 4,515,134 | 5/1985 | Warren, II | 123/557 |
| 4,686,951 | 8/1987 | Snyder | 123/527 |
| 4,765,303 | 8/1988 | Jones | 123/527 |
| 4,872,440 | 10/1989 | Green | 48/189.4 |
| 4,991,561 | 2/1991 | Gerassimov et al. | 123/527 |
| 5,058,625 | 10/1991 | Kaiser et al. | 123/527 |
| 5,150,690 | 9/1992 | Carter et al. | 123/527 |
| 5,408,978 | 4/1995 | Davis | 123/527 |

FOREIGN PATENT DOCUMENTS

| | | |
|---|---|---|
| 1552937 | 6/1976 | Netherlands . |
| 2996646 | 1/1994 | Russian Federation . |
| 579329 | 7/1946 | United Kingdom . |
| 591685 | 8/1947 | United Kingdom . |
| 778889 | 7/1957 | United Kingdom . |
| 1 552 937 | 9/1979 | United Kingdom . |
| 2292416 | 2/1996 | United Kingdom . |

OTHER PUBLICATIONS

UK Search Report dated Mar. 6, 1997.

*Primary Examiner*—Scott Kastler
*Attorney, Agent, or Firm*—Sixbey, Friedman, Leedom & Ferguson; Charles M. Leedom, Jr.; Donald R. Studebaker

[57] ABSTRACT

A gas/air mixer for injecting gas into the intake air stream of an internal cumbustion engine using a combination of radial holes and radial tubes located around the perimeter of an air flow passage. The gas/air mixer includes an intake air passage which has a combination of radial holes and radial tubes arranged so that the gas is injected into the air stream. The gas passage contains gas which is at a higher pressure than the intake air. The gas flows around an annulus which distributes the gas to all the radial holes and radial tubes. The size of the intake air passage, the number and size of the radial holes, and the number, size and length of the radial tubes can be varied in any combination to achieve adequate gas/air mixing for the particular engine application. This combination can even include a device that contains all radial holes or all radial tubes. The distance that the gas is injected into the air stream is small at the radial holes and larger at the radial tubes.

15 Claims, 2 Drawing Sheets

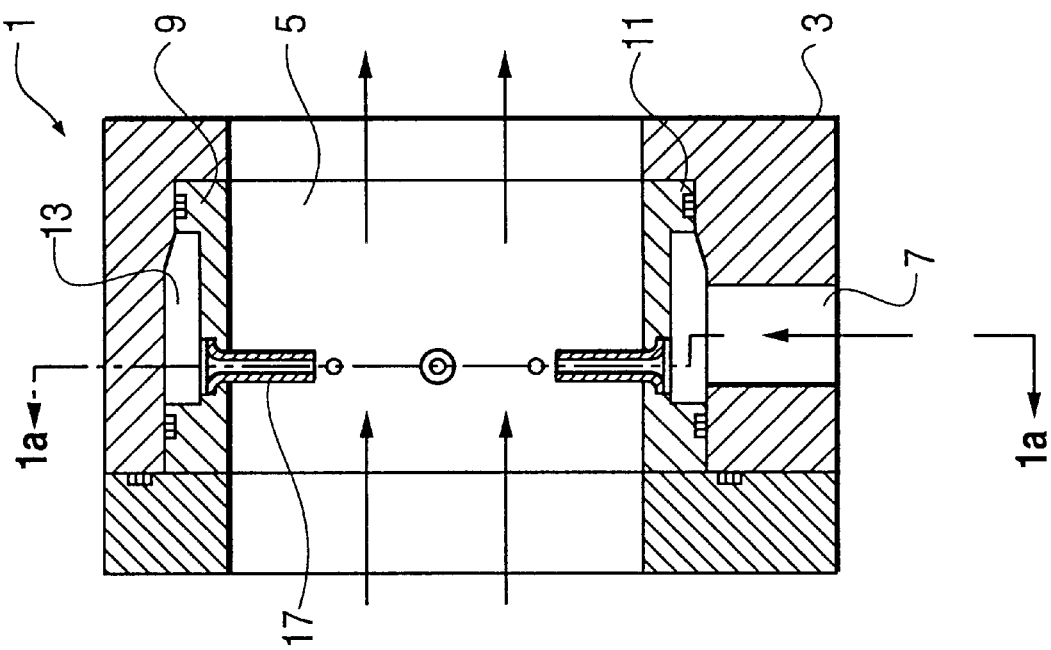
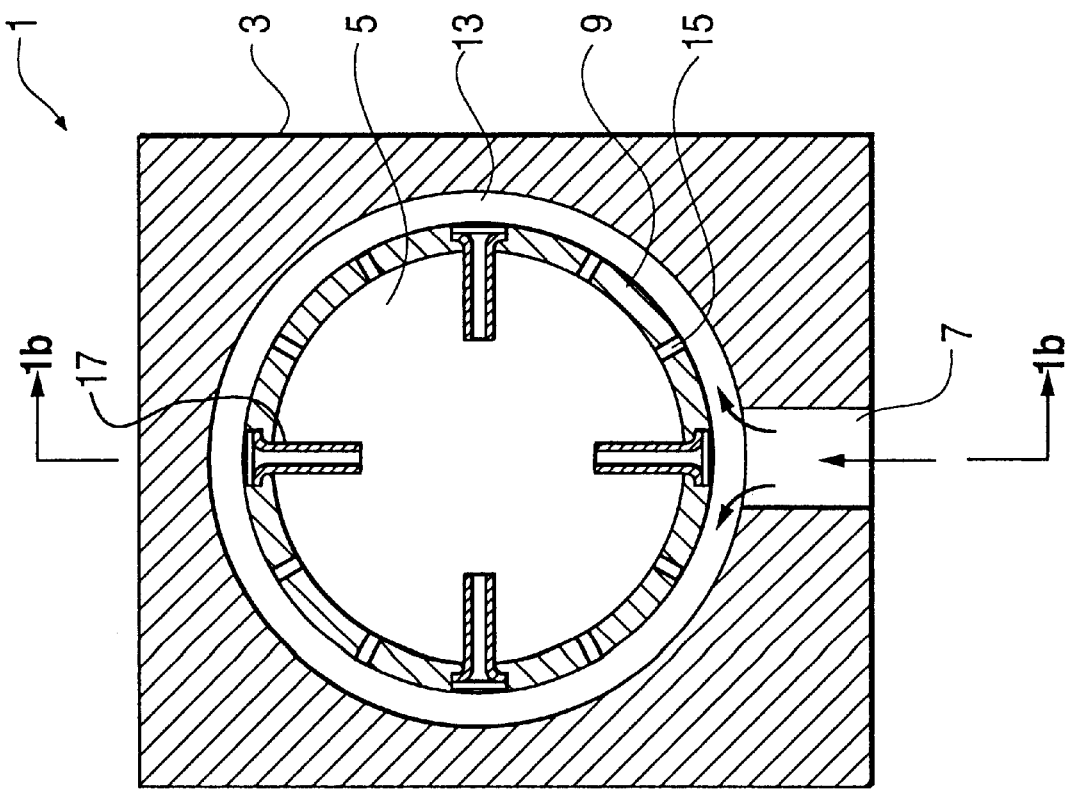

GAS/AIR MIXER

TECHNICAL FIELD OF THE INVENTION

The present invention relates to internal combustion engines and more particularly, to a gas/air mixer for use in a natural gas, liquid petroleum or other similar fueled engine for creating a uniform gas/air mixture to ensure optimum combustion.

BACKGROUND OF THE INVENTION

As different types of fuel systems are being developed to enhance the efficiency of internal combustion engines and allow for cleaner operation, manufactures are challenged to incorporate these new and improved fuel systems into an engine having a simplified design to minimize cost and complexity. One element that directly effects the efficiency at which an internal combustion engine operates is the device which controls the mixture of gas and air being fed into the engine for combustion. A design which is easy to manufacture yet meets or exceeds industry standards for gas fueled engines is currently sought by engine manufacturers.

Many different designs of gas/fuel mixers have been developed in order to enhance fuel efficiency. For example, U.S. Pat. No. 5,058,625 to Kaiser et al. discloses a valve for the intermittent introduction of fuel wherein the feeding means for supply fuel comprises inflow conduits extending into an intake passage and controlled by a rotating valve means which intermittently opens and closes the inflow conduits. Gas/air mixers such as those disclosed in Kaiser, however, are very complex and have different moving parts which could breakdown, increase the cost of repair and cause undesirable downtime. Moreover, the device disclosed in Kaiser does not appear to provide a structure that uniformly mixes gas with intake air. A non-uniform mixture could undesirably effect combustion.

A more simpler gas/air mixer design is shown in U.S. Pat. No. 5,150,690 to Carter et al. This design includes a flow control system having a gas-air mixer located in an intake air duct with a fuel diffuser tube extending across the intake air duct. The fuel diffuser tube has a plurality of openings through which the supplied fuel mixes with the air being drawn into the engine. This design, however, suffers from a similar deficiency discussed above with respect to Kaiser. Although Carter et al. discloses a gas/air mixer having a simpler design than that illustrated in Kaiser, the fuel diffuser tube extends across the center of the intake air duct, resulting in fuel being distributed only to the center of the air flow path which could affect the uniformity of the gas/air mixture at time of combustion.

An improved gas/air mixer design which appears to provide greater uniformity than the references discussed above is found in U.S. Pat. No. 4,872,440 to Green. This reference discloses an air/fuel mixing device for an internal combustion engine wherein the feeding means comprises circular apertures in an annular gas feeding device. The air/fuel mixer design of Green, however, is very complex in that the device has many different parts, some movable, which again creates a greater likelihood of breakdown resulting in costly repair and downtime. Furthermore, the complexity of the device increases manufacturing costs of the gas/air mixer and ultimately, the internal combustion engine.

A gas/air mixing device which appears to overcome the noted deficiencies of the above references is disclosed in U.S. Pat. No. 4,991,561 to Gerassimov et al. This reference is directed to a gas-air mixer including an inlet and outlet diffuser connected by a collar having uniformly shaped feeding channels which terminate in an annular channel around the diffusers connected to a gas supply. The feeding channels for the gas supplied through the annular channel are disclosed as slots which may be widened or narrowed to control the amount of gas mixed with the air in the inlet diffuser. Although Gerassimov et al. appears to disclose a gas/air mixer having greater simplicity and possibly greater gas/air uniformity than the patents discussed above, the reference includes moving parts which increase manufacturing costs and decreases the reliability of the device.

The inventors have recognized the need for a device having a simplistic design that improves the gas/air mixture by increasing its uniformity. In essence, increased uniformity results in optimal combustion and overall efficiency of the internal combustion engine. Moreover, a gas/air mixer having a simple design reduces manufacturing costs, decreases the chance of breakdown and prevents unnecessary downtime.

SUMMARY OF THE INVENTION

In view of the foregoing, it is an object of the present invention to provide a gas/air mixing device having a simple design to reduce manufacture costs yet increase the overall efficiency of the internal combustion engine.

It is also an object of the present invention to provide an improved gas/air mixer device for uniformly mixing fuel with intake air in an internal combustion engine to ensure optimal combustion when the gas/air mixture is ignited in the engine cylinders.

These and other objects are achieved by a device for mixing fuel with intake air in an internal combustion engine comprising a housing having a radial passage extending therethrough and including an opening which extends through the housing wall. The device further includes an annular cylindrical sleeve which extends around the inner radial extent of the radial passage. The sleeve includes an annular recess which defines an annulus extending between the housing and sleeve and is in fluid communication with the opening. The sleeve further includes radial apertures which provide fluid communication between the annulus and the radial passage.

The radial apertures of the annular cylindrical sleeve comprise radial tubes which extend into the radial passage and radial holes which extend through the annular cylindrical sleeve wall. The size of the radial passage, the number and size of the radial holes, and the number, size and length of the radial tubes can be varied in any combination to achieve adequate gas/air mixing for the particular engine application. This combination can even include a device that contains all radial holes or all radial tubes.

The radial holes and radial tubes are arranged so that the fuel (i.e., gas) is injected into the air stream flowing through the radial passage. The opening in the wall of the housing allows gas which is at a higher pressure than the intake air to flow therethrough. The gas flows around an annulus which distributes the gas to all the radial holes and radial tubes. The distance that the gas is injected into the air stream is small at the radial holes and larger at the radial tubes.

BRIEF DESCRIPTION OF THE DRAWINGS

FIG. 1a is a cross-sectional elevational view of the gas/air mixer in accordance with the preferred embodiment of the present invention;

FIG. 1b is a cross-sectional side view of the gas air mixer at A—A of FIG. 1a. in accordance with the preferred embodiment of the present invention;

DETAILED DESCRIPTION OF PREFERRED EMBODIMENTS

Figure 3:
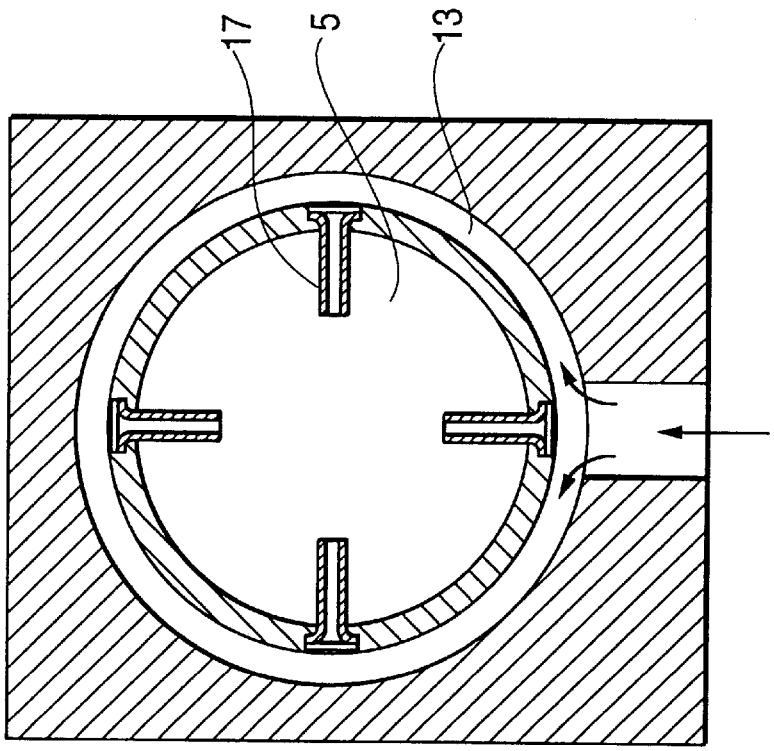
FIG. 3 is a cross-sectional elevational view of the gas/air mixer having all radial tubes in accordance with an alternative embodiment of the present invention.

The present invention is directed to a device for mixing fuel and intake air in an internal combustion engine. The device may be used in an environment where a uniform mixture of fuel and intake air is required to yield optimal combustion and increase the overall efficiency of an internal combustion engine. Moreover, the device may be modified to yield alternative embodiments a few of which are discussed below.

FIGS. 1a and 1b illustrate a gas/air mixer 1 in accordance with the preferred embodiment of the present invention. Specifically, FIG. 1a shows a cross-sectional elevational view of gas/air mixer 1 while FIG. 1b illustrates the side view of gas/air mixer 1 shown in FIG. 1a.

Gas/air mixer 1 includes a housing 3 having an intake air passage 5 and a gas passage 7. Intake air passage 5 is a radial passage which extends through housing 3 and allows air to travel between an inlet provided in the internal combustion engine for allowing external air to enter, and an outlet which leads to the engine cylinders. The diameter of intake air passage 5 may vary depending on the amount of intake air needed or desired for optimum performance of the engine.

Gas passage 7 is also a radial passage or an opening located in the wall of housing 3. Gas passage 7 extends through the wall of housing 3 and is perpendicular to intake air passage 5. The diameter of gas passage 7 is smaller than that of intake air passage 5 and is designed to allow fuel to flow therein from an external source which is not illustrated in FIG. 1a and not part of the present invention.

Gas/air mixer 1 further includes an annular cylindrical sleeve 9 which is illustrated in FIG. 1b. Annular cylindrical sleeve 9 extends around the inner radial extent and abuts the inside wall of intake air passage 5. The sleeve fits within a recess 11 of housing 3 so that the inner surface of annular cylindrical sleeve 9 is flush with the inner walls defining intake air passage 5. An annular recess or groove is formed in annular cylindrical sleeve 9 to create an annulus 13 which extends along the outer radial extent of annular cylindrical sleeve 9. Annulus 13 is defined by the outer radial extent or surface of annular cylindrical sleeve 9 and the inner radial extent of housing 3. Annulus 13 is in fluid communication with gas passage 7 and intake air passage 5 to allow fuel to mix with air within intake air passage 5 during engine operation.

Gas passage 7 is directly connected to annulus 13 to allow fuel to flow therebetween as illustrated in both FIGS. 1a and 1b. Fluid communication between annulus 13 and intake air passage 5 is provided through radial apertures comprising radial holes 15 and radial tubes 17 which are both illustrated in FIG. 1a.

Radial holes 15 extends through the wall of annular 13 and are evenly spaced between radial tubes 17. In the preferred embodiment, the radial holes are equidistantly spaced between radial tubes along the circumference of annular cylindrical sleeve 9. Moreover, a total of at least eight radial holes are used in the preferred embodiment to allow for uniform distribution of fuel to intake air passage 5. The diameter of the radial holes are the same and can vary in size depending on the amount of fuel that needs to be mixed with intake air for optimum combustion. One skilled in the art should appreciate that the size, shape, and number of radial holes may vary depending on the desired mixture of fuel and intake air.

Radial tubes 17 are rigidly connected to annulus 13 and are spaced equidistantly apart. The tubes extend inward into intake air passage 5 and are provided around the inner circumference of the annulus 13 so that fuel may be distributed towards the center of intake air passage 5. In the preferred embodiment and as illustrated in FIG. 1a, there are four tubes provided in annulus 13 which are arranged such that at least two radial tubes are opposed, illustrated in both FIGS. 1a and 1b. Moreover, the diameter of radial tubes 17 may be the same as or different than radial holes 15, however, the size may be changed depending on the amount of fuel to be discharged into intake air passage 5. As stated above with regard to radial holes 15, one skilled in the art should appreciate that the size, shape, and number of radial tubes may vary depending on the desired mixture of fuel and intake air.

During engine operation, gas passage 7 contains gas which is at a higher pressure than the intake air. The gas flows around annulus 13 which distributes the gas to all the radial holes 15 and radial tubes 17. The size of intake air passage 5, radial holes 15 and radial tubes 17 may be varied in any combination to achieve adequate gas/air mixing for the particular engine application. The distance that the gas is injected into the air stream is small at radial holes 15 and larger at radial tubes 17. The gas/air mixture proportions can be controlled by varying the gas pressure in annulus 13 as a function of the air flow using a separate control system which is not included as a part of this invention.

Figure 2:
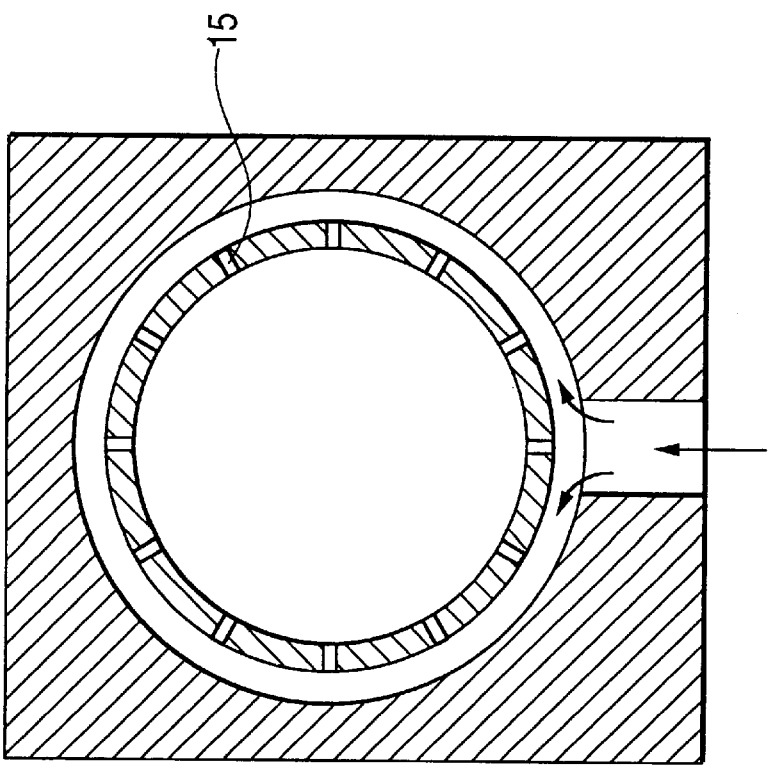
FIG. 2 is a cross-sectional elevational view of the gas/air mixer having all radial holes in accordance with an alternative embodiment of the present invention.

FIG. 2 illustrates an alternative embodiment of the present invention. Specifically, the structure in FIG. 2 shows the present invention with all radial holes 15. Radial holes 15 are spaced equidistantly apart to provide a uniform stream of gas into the intake air passage for an optimal gas/air mixture. The holes may have the same or different diameters depending on the desired amount of fuel to be mixed with intake air. For example, if a greater fuel flow is desired, the diameter of the holes could be enlarged. However, if a lesser flow of gas is desired then the diameter of radial holes 15 could be reduced to restrict the flow of fuel entering intake air passage 5.

FIG. 3 illustrates yet another embodiment of the present invention. A gas/air mixer device is shown having all radial tubes 17. In this embodiment, the number, size and shape of radial tubes 17 may be changed to achieve the desired amount of fuel dispersed into intake air passage 5. The tubes extend into the center of intake air passage 5 to provide fuel therein. The lengths of the tubes may be altered to provide a uniform amount of fuel to both the outer areas (near the inner walls of annulus 13) and inner areas (near the center of the intake air passage) of intake air passage 5.

While the invention has been described with reference to the preferred embodiment, it should be appreciated by those skilled in the art that the invention may be practiced otherwise than as specifically described herein without departing from the spirit and scope of the invention. It is therefore, understood that the spirit and scope of the invention be limited only by the appended claims.

What is claimed is:

1. A device for mixing fuel with intake air in an internal combustion engine, comprising:

a housing having an axial passage extending therethrough, said housing including an opening extending through a side wall of said housing;

an annular cylindrical sleeve defining at least a portion of said axial passage, said sleeve having an annular recess which defines an annulus between said housing and said sleeve and in fluid communication with said opening;

a plurality of fuel passages spaced equidistant along the circumference of said sleeve, each of said fuel passages including a tube radially extending into said axial passage; and a plurality of radial apertures formed in said annular cylindrical sleeve and spaced equidistant apart between at least two of said tubes for providing fluid communication between said annulus and said axial passage.

2. A device for mixing fuel with intake air in an internal combustion engine, comprising:

a housing having an inlet and an outlet, said inlet including an air inlet and a fuel inlet; and a fluid communication means provided in said housing for delivering fuel from said fuel inlet into said air inlet, said fluid communication means including a plurality of radial tubes and radial apertures formed in said housing, for mixing fuel with the intake air in the air inlet;

wherein said fluid communication means provides an even distribution of fuel to said air inlet to create a uniform air/fuel mixture at said fluid outlet.

3. The device of claim 2, further comprising an axial passage formed in said housing between said air inlet and said outlet.

4. The device of claim 2, wherein said fuel inlet is an opening in a wall of said housing.

5. The device of claim 2, wherein said housing includes an annular cylindrical sleeve which extends around an inner radial extent of said housing.

6. The device of claim 5, wherein said fluid communication means further includes a series of radial holes provided in said annular cylindrical sleeve and spaced equidistant apart.

7. The device of claim 1, wherein said axial passage is shaped to allow fluid to pass unrestricted therethrough, such that fluid flow pressure along said axial passage is substantially uniform.

8. The device of claim 1, wherein said annular sleeve has a uniform shape within said housing.

9. The device of claim 1, wherein said annular sleeve is formed from a single piece of material.

10. The device of claim 1, wherein is said plurality of radial tubes form two diametrically opposed pairs, each pair being positioned in the same vertical plane and the same horizontal plane.

11. The device of claim 1, wherein two radial apertures are formed between adjacent radial tubes and are directly opposed to two respective radial apertures formed between two different adjacent radial tubes.

12. The device of claim 5, wherein said annular sleeve has a uniform shape within said housing.

13. The device of claim 5, wherein said annular sleeve is formed from a single piece of material.

14. The device of claim 2, wherein is said plurality of radial tubes form two diametrically opposed pairs, each pair being positioned in the same vertical plane and the same horizontal plane.

15. The device of claim 6, wherein two radial apertures are formed between adjacent radial tubes and are directly opposed to two respective radial apertures formed between two different adjacent radial tubes.

* * * * *